United States Patent
Atsmon et al.

(10) Patent No.: US 10,169,066 B2
(45) Date of Patent: Jan. 1, 2019

(54) SYSTEM AND METHOD FOR ENHANCING ADVANCED DRIVER ASSISTANCE SYSTEM (ADAS) AS A SYSTEM ON A CHIP (SOC)

(71) Applicant: iOnRoad Technologies Ltd., Ramat-Gan (IL)

(72) Inventors: Dan Atsmon, Rehovot (IL); Ohad Akiva, Ramat-Gan (IL); Yair Hougui, Tel-Mond (IL)

(73) Assignee: iOnRoad Technologies Ltd., Ramat-Gan (IL)

( * ) Notice: Subject to any disclaimer, the term of this patent is extended or adjusted under 35 U.S.C. 154(b) by 167 days.

(21) Appl. No.: 15/228,078

(22) Filed: Aug. 4, 2016

(65) Prior Publication Data
US 2017/0039084 A1 Feb. 9, 2017

Related U.S. Application Data

(60) Provisional application No. 62/201,604, filed on Aug. 6, 2015.

(51) Int. Cl.
*G06F 9/455* (2018.01)
*B60W 50/06* (2006.01)
*H04L 29/08* (2006.01)
*B60W 50/00* (2006.01)

(52) U.S. Cl.
CPC ......... *G06F 9/45558* (2013.01); *B60W 50/06* (2013.01); *H04L 67/12* (2013.01); *B60W 2050/0043* (2013.01); *G06F 2009/45595* (2013.01)

(58) Field of Classification Search
None
See application file for complete search history.

(56) References Cited

U.S. PATENT DOCUMENTS

| 8,418,230 | B1 * | 4/2013 | Cornelius | G06F 21/77 726/3 |
|---|---|---|---|---|
| 9,147,078 | B2 * | 9/2015 | Muff | G06F 9/45533 |
| 9,165,196 | B2 * | 10/2015 | Kesavan | G06K 9/00791 |
| 9,405,700 | B2 * | 8/2016 | Wingard | G06F 12/1027 |
| 2016/0328254 | A1 * | 11/2016 | Ahmed | G06F 9/45558 |
| 2016/0328272 | A1 * | 11/2016 | Ahmed | G06F 9/4881 |

OTHER PUBLICATIONS

Weber et al., "A Quality-of-Service Mechanism for Interconnection Networks in System-on-Chips" 2005 IEEE, 6 pages.*

* cited by examiner

*Primary Examiner* — Van H Nguyen
(74) *Attorney, Agent, or Firm* — McCoy Russell LLP

(57) ABSTRACT

A system on chip (SoC) having an integrated circuit (IC) integrating into a single chip advance driver assistance systems (ADAS) processing unit(s), application processing unit(s), at least one memory storing ADAS code comprising ADAS computer instructions adapted to be executed on the ADAS processing unit(s) for processing vehicle sensor data and VM code for executing VM(s) on the application processing unit(s) and a hypervisor which manages an execution of at least one operation system of the VM(s) and an access to a processor shared memory of the ADAS processing unit(s) for acquiring an outcome of executing the ADAS computer instructions for the completion of an ADAS enhancing function by the execution of the VM(s) on the application processing unit(s).

18 Claims, 4 Drawing Sheets

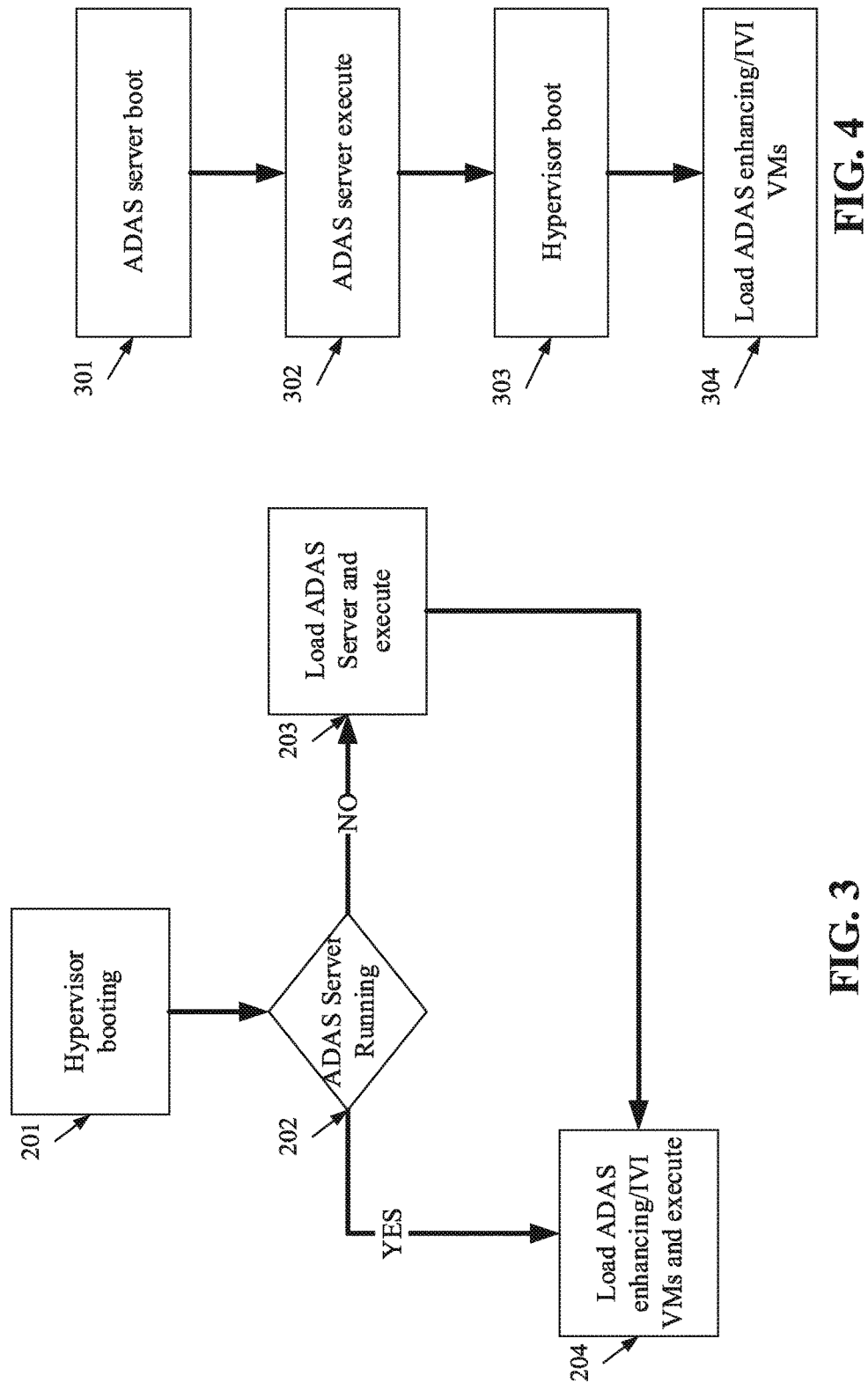

SYSTEM AND METHOD FOR ENHANCING ADVANCED DRIVER ASSISTANCE SYSTEM (ADAS) AS A SYSTEM ON A CHIP (SOC)

RELATED APPLICATION

This application claims the benefit of priority under 35 USC 119(e) of U.S. Provisional Patent Application No. 62/201,604 filed Aug. 6, 2015, the contents of which are incorporated herein by reference in their entirety.

FIELD AND BACKGROUND OF THE INVENTION

The present invention, in some embodiments thereof, relates to on board vehicle platforms and, more specifically, but not exclusively, to an on board vehicle platform for hosting an advanced driver assistance system (ADAS) and an in-vehicle infotainment (IVI) system.

An advanced driver assistance system (ADAS) helps a driver in the driving process. ADAS technology was developed to improve the comfort, efficiency, safety, and overall satisfaction of driving. ADAS features may use a variety of sensor mechanisms in the vehicle to determine the current state of the vehicle and the current state of the roadway in front of the vehicle. The ADAS features provide feedback to the driver.

Another in vehicle device that is commonly used as an in-vehicle infotainment (IVI) system that provides a user with functions such as a vehicle information display function, a navigation function or a TV output function through an image display device mounted in a vehicle. Recently, with technological development, it is possible to execute a web application through an in-vehicle infotainment processor mounted in a vehicle.

SUMMARY OF THE INVENTION

According to some embodiments of the present invention, there is provided a system on chip (SoC), comprising: an integrated circuit (IC) integrating the following into a single chip: at least one advance driver assistance systems (ADAS) processing unit, at least one application processing unit, at least one memory storing ADAS code comprising ADAS computer instructions adapted to be executed on the at least one ADAS processing unit for processing vehicle sensor data and VM code for executing on the at least one application processing unit at least one VM separately and independently from an execution of the ADAS code, and a hypervisor which manages an execution of at least one operation system (OS) of the at least one VM and an access to a processor shared memory of the at least one ADAS processing unit for acquiring an outcome of executing the ADAS computer instructions for the completion of an ADAS enhancing function by the execution of the at least one VM on the at least one application processing unit.

Optionally, the hypervisor manages an allocation of a hardware resource shared by the at least one VM and at least one thread generated by an execution of the ADAS code by the at least one ADAS processing unit.

More optionally, the allocation is done at a build or setup stage.

More optionally, the hardware resource is the at least one application processing unit.

More optionally, the hardware resource is selected from a group consisting of a display, a storage memory, serial AT Attachment (ATA) (SATA), and a universal serial bus (USB) port.

More optionally, the at least one VM comprises an ADAS enhancing VM for executing a plurality of ADAS enhancing functions using the outcome.

More optionally, the at least one VM further comprises at least one in-vehicle infotainment (IVI) VM for executing a plurality of IVI functions using the application processing unit.

More optionally, the hypervisor prioritizes a usage of the at least one application processing unit by the ADAS enhancing VM over the at least one IVI VM based on one or more predefined priority rules.

More optionally, the plurality of ADAS enhancing functions comprises instructions to display the outcome on a map display executed by the ADAS enhancing VM.

More optionally, the plurality of ADAS enhancing functions comprises instructions to display the outcome on a dashboard display executed by the ADAS enhancing VM.

More optionally, the at least one ADAS processing unit comprises at least one digital signal processing unit and the at least one application processing unit comprises at least one central processing unit (CPU) used for executing functions of both the at least one VM and the ADAS code.

More optionally, the ADAS code and the at least one VM are executed on different operating systems.

More optionally, when a reboot is held, the hypervisor is loaded as an outcome of executing a thread of the ADAS code.

More optionally, when a reboot is held the hypervisor loads the at least one VM only after the ADAS code is loaded and executed by the at least one ADAS processing unit.

More optionally, an execution of the ADAS code comprises execution of a plurality of ADAS functions each selected from a group consisting of: adaptive cruise control (ACC), adaptive high beam, glare-free high beam and pixel light, adaptive light control: swivelling curve lights, automatic parking, automotive night vision, blind spot monitor, collision avoidance system, crosswind stabilization, driver drowsiness detection, driver Monitoring System, electric vehicle warning sounds (used in hybrids and plug-in electric vehicles), emergency driver assistant, Forward Collision Warning, Intersection assistant, Hill descent control, intelligent speed adaptation or intelligent speed advice (ISA), Lane departure warning system, Lane change assistance, Pedestrian protection system, Traffic sign recognition, Turning assistant, Vehicular communication systems, Wrongway driving warning, and lane departure warning.

According to some embodiments of the present invention, there is provided a method of executing an ADAS enhancing function on system on chip (SoC). The method comprises: processing vehicle sensor data according to at least one advance driver assistance systems (ADAS) function by executing ADAS code on at least one ADAS processing unit integrated in an integrated circuit (IC), storing at least one outcome of the processing in a processor shared memory of the at least one ADAS processing unit, using a hyper visor to manage execution of at least one operation system of at least one VM on at least one application processing unit integrated in the IC separately and independently from an execution of the ADAS code, managing by the hypervisor an access to the processor shared memory of the ADAS processing unit for acquiring the at least one outcome for a completion of an ADAS enhancing function by execution of the at least one VM on the at least one application processing unit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is an exemplary booting process, according to some embodiments of the present invention;

FIG. 4 is another exemplary booting process, according to some embodiments of the present invention.

DESCRIPTION OF SPECIFIC EMBODIMENTS OF THE INVENTION

Figure 1:
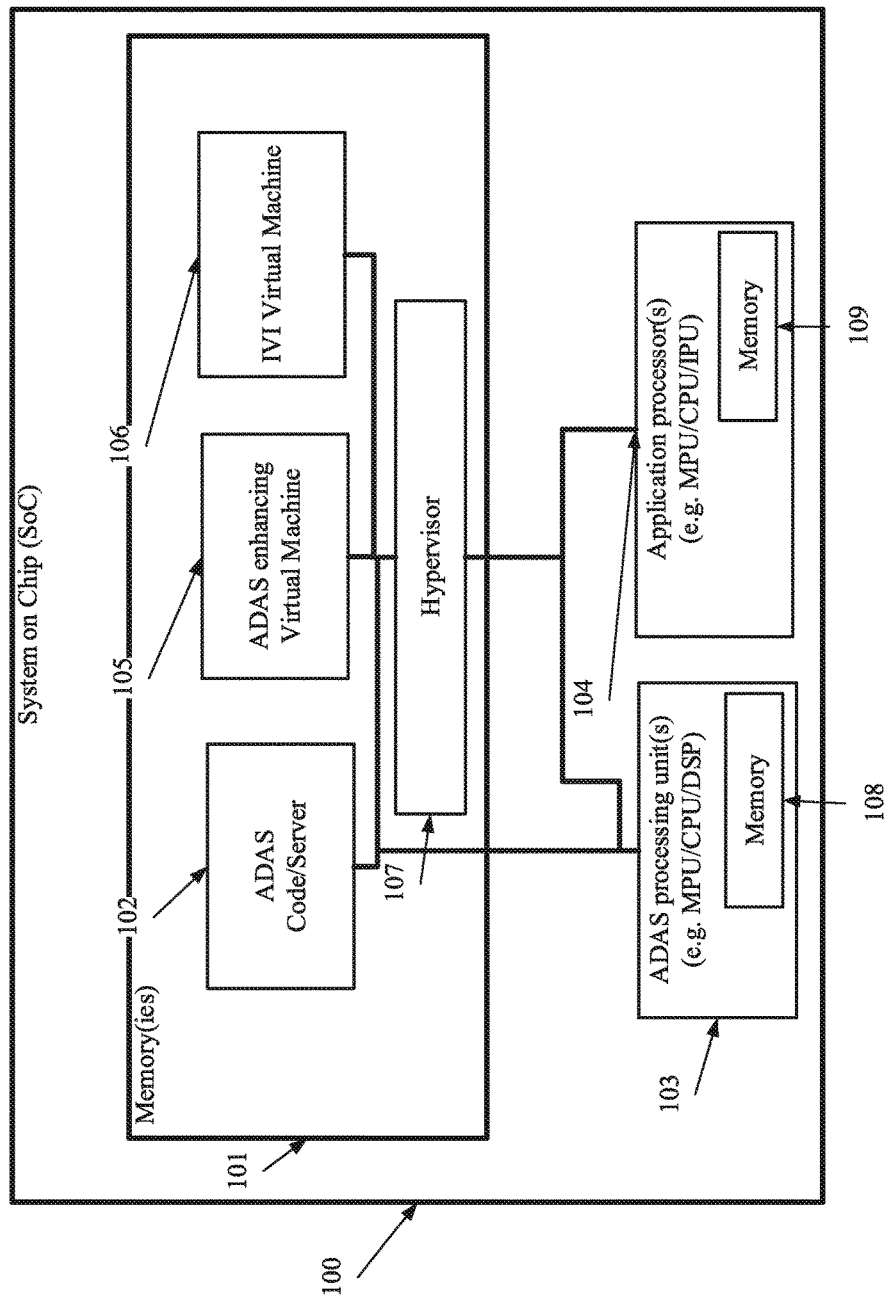
FIG. 1 is a schematic illustration of a single system on chip (SoC) that executes an ADAS code and one or more virtual machines (VMs) using shared hardware resources, according to some embodiments of the present invention.

The present invention, in some embodiments thereof, relates to on board vehicle platforms and, more specifically, but not exclusively, to an on board vehicle platform for hosting an advanced driver assistance system (ADAS) and an in-vehicle infotainment (IVI) system.

According to some embodiments of the present invention, there is provided a system on chip (SoC) for executing ADAS code and one or more virtual machines (VMs) using shared hardware resources by using a hypervisor. The hypervisor allows acquiring output(s) of ADAS functions executed on an ADAS designated processor and using these output(s) for completing functions of the one or more virtual machines, for instance ADAS enhancing functions or IVI functions. The hypervisor optionally manages usage of some hardware resources by the one or more VMs and an ADAS server executed according to the ADAS code while other hardware resources are designated to the ADAS server only. The hypervisor optionally manages the usage of some hardware resources based on a predefined prioritization.

The SoC allows executing ADAS functions, such as velocity calculation, adaptive cruise control (ACC), and Lane departure warning, in parallel to ADAS enhancing functions which use information calculated by the ADAS functions, for example augmenting a lane departure warning in an augmented reality display or in a digital map.

According to some embodiments of the present invention, there is provided a SoC having an integrated circuit (IC) integrating into a single chip ADAS processing unit(s), application processing unit(s), at least one memory storing ADAS code comprising ADAS computer instructions adapted to be executed on the ADAS processing unit(s) for processing vehicle sensor data and VM code for executing VM(s) on the application processing unit(s) and a hypervisor which manages an execution of at least one operation system of the VM(s) and an access to a processor shared memory of the ADAS processing unit(s) for acquiring an outcome of executing the ADAS computer instructions for the completion of an ADAS enhancing function by the execution of the VM(s) on the application processing unit(s).

Using the SoC allows reducing the total cost for providing ADAS functions and optionally IVI functions and/or to improve their computational abilities, for instance by allowing the VM(s) to access outcomes of ADAS functions which are stored in a shared memory of a processor used by the ADAS server and/or by providing the ADAS server 102 with access to all or some of the computational and storage resources of the VM(s). The outcome, also referred to as ADAS data, may be a final outcome or a temporary outcome of any ADAS function as defined herein.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of a single system on chip (SoC) 100 that executes an ADAS code, for instance a firmware, referred to herein as an ADAS server 102 and one or more virtual machines (VMs), such as 105, 106 using shared hardware resources without compromising ADAS server performances, according to some embodiments of the present invention. The execution of the ADAS server 102 involves execution of ADAS functions and the execution of the VMs involves execution of at least ADAS enhancing functions which receive outputs of the ADAS functions as an input.

As indicated below, the single SoC 100, referred to herein also as SoC 100, allows executing the ADAS functions of the ADAS server 102, at least critical safety functions of an ADAS enhancing VM 105, and optionally non-critical safety functions of an IVI VM 106 on a common hardware platform without causing interference between the execution of the ADAS server 202 and the VM(s), for example when the ADAS functions are active and may take control over vehicle movement for a period. Such a SoC 100 is different from many on-vehicle platforms wherein ADAS functions are executed on a designated hardware that is separate from the hardware used by an IVI platform or an ADAS enhancement platform. The SoC 100 allows optimizing the hardware used for executing ADAS functions, ADAS enhanced functions, and IVI functions by allowing the ADAS server and VM(s) to share computation resources for performing inter alia intensive arithmetic computations which may be hardware accelerated, for instance video decoding and graphics generation functions. Such optimization allows reducing the total cost for providing ADAS functions and optionally IVI functions and/or to improve their computational abilities, for instance by allowing the VM(s) to access outcomes of ADAS functions which are stored in a shared memory of a processor used by the ADAS server and/or by providing the ADAS server 102 with access to all or some of the computational and storage resources of the VM(s). The outcome, also referred to as ADAS data, may be a final outcome or a temporary outcome of any ADAS function as defined herein.

The single SoC 100 is an integrated circuit that integrates digital, analog, mixed-signal, and/or radio-frequency functions on a single chip substrate. The SoC includes resources such as processing unit(s) 103, 104, for example microcontrollers, micro processing unit(s), or digital signal processor core(s) which are shared by the ADAS server and one or more virtual machines (VMs), for example an ADAS enhancing VM 105 for providing at least safety critical functions and IVI VM 106 for providing IVI functions. In some embodiments, the SoC 100 may include more than one processor core. The SoC 100 may further include a ROM, RAM, Electrically Erasable Programmable Read Only Memory (EEPROM), flash memory, and/or any other type of non-volatile memory for hosting and running the ADAS server 102 and/or the one or more virtual machines (VMs) 105, 106. The SoC 100 may include one or more timing sources, such as oscillators and/or phase-locked loops. The SoC 100 may include interfaces, such as USB, FireWire, Ethernet, Universal Asynchronous Receiver/Transmitter (US ART), Serial Peripheral Interface (SPI) bus, and/or Media Oriented Systems Transport (MOST) bus. In some embodiments, the SoC 101 communicates with one or more I/O devices for performing at least some of the functions described herein. For example, the SoC 100 may be an on vehicle platform such as DRA72x or DRA74x OMAP™ Automotive Applications Processing unit(s) of Texas instrument (TI)™ which the specification thereof is incorporated herein by reference.

The SoC 100 hosts, for example on an on-chip memory 101, an ADAS server 102 adapted to receive data from a plurality of in vehicle sensors, for example any data-gathering elements associated with the respective vehicle and gather audio, visual, and/or environmental information within or associated with the vehicle. For example, the vehicle sensors may include one or more cameras in a cabin of the vehicle that may capture images of the passengers and/or driver and/or scene information, such as lighting conditions within the vehicle or weather outside of the vehicle 102. Vehicle sensors may include one or more global positioning system (GPS) devices, Radar sensor, Light Detection And Ranging (LIDAR) system sensor, microphones, seat weight sensors, and/or other type of data gathering elements associate with the vehicle. Other vehicle sensors examples include laser sensors, infrared sensors, accelerometers, or any combination thereof. In addition, the ADAS server 102 may have a direct access to hardware resources such as a CAN bus, Vehicle-to-Everything (V2X) interface and/or any other interfaces.

The ADAS server 102 is hosted and executes, using ADAS designated processing unit(s) 103, ADAS functions intended to help a driver in the driving process for increasing vehicle and road safety, for instance by providing alert and convenience and/or for operating vehicle control functions which operate vehicle system automatically. Example of an ADAS functions which may be executed by the SoC are adaptive cruise control (ACC), adaptive high beam, glare-free high beam and pixel light, adaptive light control: swivelling curve lights, automatic parking, automotive night vision, blind spot monitor, collision avoidance system, crosswind stabilization, driver drowsiness detection, driver Monitoring System, electric vehicle warning sounds (used in hybrids and plug-in electric vehicles), emergency driver assistant, Forward Collision Warning, Intersection assistant, Hill descent control, intelligent speed adaptation or intelligent speed advice (ISA), Lane departure warning system, Lane change assistance, Pedestrian protection system, Traffic sign recognition, Turning assistant, Vehicular communication systems, Wrong-way driving warning, and lane departure warning. ADAS functions may be any operation defined in ISO26262 standard or AutoSAR standard which are incorporated herein by reference.

The ADAS designated processing unit(s) 103 may include one or more specialized processing unit(s) or processing unit(s) such as digital signal processing unit(s) (DSPs), for example DSP C66x. The ADAS designated processing unit(s) 102 are optionally not allocated to any thread not originated from the ADAS server 102.

As outlined above, the SoC 100 includes application processing unit(s) 104. The application processing unit(s) 104 may include any number of suitable processing unit(s) or processing unit(s), such as a central processing unit ("CPU"), a reduced instruction set computer ("RISC"), a complex instruction set computer ("CISC"), a microprocessor, a microcontroller and other processing units which can accelerate tasks and offload computations from a main CPU.

The ADAS enhancing VM 105 is adapted to execute ADAS enhancing functions. An ADAS enhancing function is a function that receives outputs of ADAS functions executed by the ADAS server as an input for calculating an enhanced data not provided by the ADAS server 102, for example an integration of outputs ADAS functions such as movement, velocity, collusion alert, lane departure warning data and/or the like in a display of a digital map that provides useful information not reliably provided by vehicle sensors. Such a digital map may provide a predictive capability beyond a measuring range of vehicle sensors and/or beyond a vision of the driver to determine driving obstructions ahead of the vehicle, for example around corners, over hills and/or the like. Another example of an ADAS enhancing function is displaying a virtual dashboard display that presents outputs ADAS functions such as movement, velocity, collusion alert, lane departure warning data and/or the like. Such a virtual dashboard display may be presented in an augment reality device in the vehicle and/or on a screen that faces the driver.

As outlined above, the SoC 100 further hosts, for example on the on chip memory 101, one or more VMs 105, 106 which are executed using the application processing unit(s) 104. The SoC 100 hosts a hypervisor 107 that provides operating systems of the VMs 105, 106 with a virtual operating platform to manage the execution of the operating systems. Multiple instances of a variety of operating systems may share the virtualized hardware resources which are managed by the hypervisor 107, for example memory and application processing unit(s) 104. The hypervisor 107 further manages an access of the VMs 105, 106 to memory 108 of the ADAS processing unit(s) 103 and to memory 109 of the application processing unit(s) 104. This allows the ADAS server 102 to update the one or more of the VMs 105, 106 with data relevant for presenting specific alerts and/or for performing processing of sensors outputs which are processed using the ADAS processing unit(s) 103 such as recording of video decoded using the ADAS processing unit(s) 103 and/or the like. It should be noted that as the hypervisor 107 is hosted on the SoC it has a high bandwidth channel with the ADAS server 102 and/or the memory 108 of the ADAS processing unit(s) 103. This high bandwidth channel is an intra IC connection and therefore faster than a Controller Area Network (CAN) architecture channel or any other inter IC connection channel known in the art. This connection allows dealing with a correlation of three dimensional (3D) maps (depth maps) and the ADAS sensors readings and/or ADAS algorithm outputs.

Additionally or alternatively, the hypervisor 107 manages access(es) of the ADAS server 102 to the resource(s) which are shared with the VMs 105, 106, for instance to the application processing unit(s) 104 and/or the memory thereof 109. Other resources which the access thereto is managed by the hypervisor 107 may be a display, a storage memory, serial AT Attachment (ATA) (SATA), universal serial bus (USB) and/or the like. These resources may be accessible to the ADAS server 102 via the hypervisor 107 that provides the physical access thereto. Optionally, the hypervisor 107 manages usage of resources based on one or more predefined priority rules, for instance granting access requests from threads of the ADAS server 102 before access requests from threads of the VMs 105, 106 and/or prioritize requests from one VM over another.

The above described SoC allows avoiding interference between the ADAS server 102 and VMs 105, 106 as the VMs 105, 106 do not operate on the ADAS processing unit(s) 103 and cannot block, hinder or deprioritize ADAS threads or degrade the user experience of the ADAS functions. As the VMs 105, 106 do not operate on the ADAS processing unit(s) 103; the ADAS server 102 is not affected from any processing or execution malfunction of the VMs 105, 106. Moreover, the ADAS server 102 may be rebooted separately from the VMs 105, 106, for example as described below.

Furthermore, malwares such as worms, viruses, and/or bots which may penetrated to the VMs 105, 106 cannot propagate into the ADAS server 102 as the ADAS server 102 is executed on a separate operating system such as a real time operating system (RTOS) or any ISO26262 standard and/or AutoSAR standard complainant operating system such as QNX. Another barrier for preventing a malwares from affecting the ADAS server 102 is to provide the VMs 105, 106 with a read only access to the memory 108 of the ADAS processing unit(s) 103, for instance cache memory, shared memory space.

Moreover, the VMs 105, 106 and the ADAS server 102 may run on different operating systems, for instance while the ADAS server 102 is executed under QNX, the VMs 105, 106 are executed under Android OS, Linux OS, or Windows or any other OS, for example any High Level Operating System (HLOS) that supports symmetrical multi-processing (SMP) architecture. This facilitates fast boot time for the ADAS server 102 separately from the boot time of the VMs 105, 106.

Figure 2:
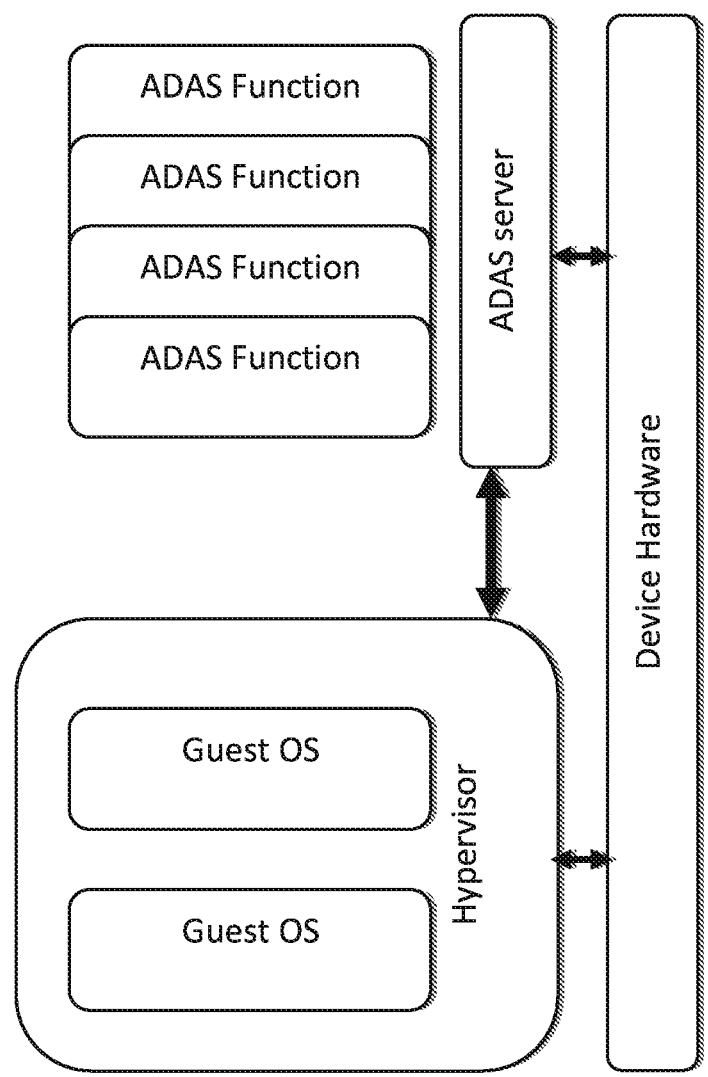
FIG. 2 is a schematic illustration of an exemplary software architecture wherein a plurality of guest operating systems of a plurality of VMs are executed by a hypervisor using device hardware which is shared with an ADAS server, according to some embodiments of the present invention. In such embodiments.

Reference is now also made to FIG. 2, which is a schematic illustration of an exemplary software architecture wherein a plurality of guest operating systems of a plurality of VMs such as 105 and 106 are executed by a hypervisor, such as 107 using device hardware, also known as resources, which are shared with an ADAS server, such as 102 that executes a plurality of different ADAS functions in parallel, according to some embodiments of the present invention. In such embodiments, ADAS functions and ADAS enhanced functions and optionally IVI functions are executed at least partly using common device resources such as processing unit(s).

Optionally, a Semaphore and/or Mutex is used for managing resource sharing, optionally using Spinlocks. Optionally a direct access to the hardware resources is done only by the ADAS server 102 and the hypervisor 107.

Optionally, the guest operating systems are used for presenting data outputted by the ADAS functions only and have higher priority over other guest operating systems. In case this specific OS crashes ADAS can still continue to run and even provide critical alerts to the driver as the ADAS Server has access to its own hardware resources and alert the driver using these resources.

As indicated above, the ADAS server 102 has direct access to hardware resources such as vehicle sensors, CAN bus, and communication interfaces required for its functionality. These resources are optionally not accessible by the hypervisor 107.

The architecture described above supports various booting schemes, for example prioritizing the booting the ADAS server 102 before the VMs 105, 106 and/or the ADAS enhancing VM 105 before the IVI VM 106.

This allows loading ADAS function threads which are essential to execute when the vehicle is ignited such as threads of image processing functions of an output of a front image sensor, analysis function of data from a rear pedestrian detection IR sensor, a Forward Collision Warning (FCW) function or a Lane Departure Warning (LDW) function. Once these ADAS function threads are loaded and running the rest of the threads are loaded. For example, resources of the ADAS server 102, including the ADAS processing unit(s) 103 and required memory and/or interfaces such as sensor interfaces are programmed to be allocated to the ADAS server 102 before the hypervisor 107 loads the operating systems of the VMs 105, 106.

As described above, ADAS enhancing functions may include display functions for displaying ADAS functions outputs. In runtime, the hypervisor 107 may maintain a communication channel with the ADAS server 102 or with the memory 108 of the ADAS processing unit(s) 103 in order to acquire status data indicative of a proper functioning of the ADAS server 102 and/or to provide a channel to acquire ADAS functions outputs as an input to ADAS enhancing functions and/or IVI functions which generate a display of the ADAS functions outputs to the driver.

Reference is now made to FIG. 3, which is an exemplary booting process wherein the hypervisor is loaded regardless of whether the ADAS server 102 running or not, according to some embodiments of the present invention. In the process depicted in FIG. 3, after the hypervisor 107 is loaded 201, the operation of the ADAS server 102 is assured 202. When the ADAS server 102 is not loaded, ADAS server load instructions are automatically sent to execution 203. When the ADAS server 102 is loaded, VM 105 and/or VM 106 are loaded to execution 204.

In such embodiments, when the hypervisor 107 is reset or rebooted, for example as an outcome of an error or re-ignition of the vehicle, the hypervisor 107 is reloaded and queries to determine the operation status of the ADAS server 102 (e.g. alive or inoperative). In case the hypervisor 107 finds that ADAS is up and running then there is no need to load ADAS software and continue directly to loading guest operating systems of the VMs 105, 106.

Reference is now made to FIG. 4, which is an exemplary booting process, according to some embodiments of the present invention. In the process depicted in FIG. 4, the ADAS server 102, for example ADAS software code, is loaded and executed before the hypervisor 107 is loaded. Optionally, the instructions for booting the hypervisor 107 are executed as a thread of the ADAS server 102. Once hypervisor code is loaded and running IVI code is loaded and executed.

Optionally, the SoC 100 has at least two memory ports, for example a port to a Double data rate (DDR) memory such as a DDR synchronous dynamic random-access memory (SDRAM). In such embodiment the ADAS server 102 may be allocated with one port and the one or more VMs 105, 106 may be allocated with one or more of the others. Optionally, the SoC 100 has a single port to a memory unit. In such embodiment the hypervisor 107 verifies whether the DDR memory is configured by reading/writing. When verification fails a boot process may be instructed to load the ADAS server.

In order to determine whether an ADAS server is reset or shut down properly, configuration information indicating a current state is saved in a non-volatile memory, for example every state change. Optionally, the configuration information indicates which algorithms and services were running prior to reset and/or reboot event.

Other common resources like GPU and other hardware accelerators may be shared between the ADAS server 102 and the VMs 105, 106, for instance using spinlocks or Mutexes.

Figure 5:
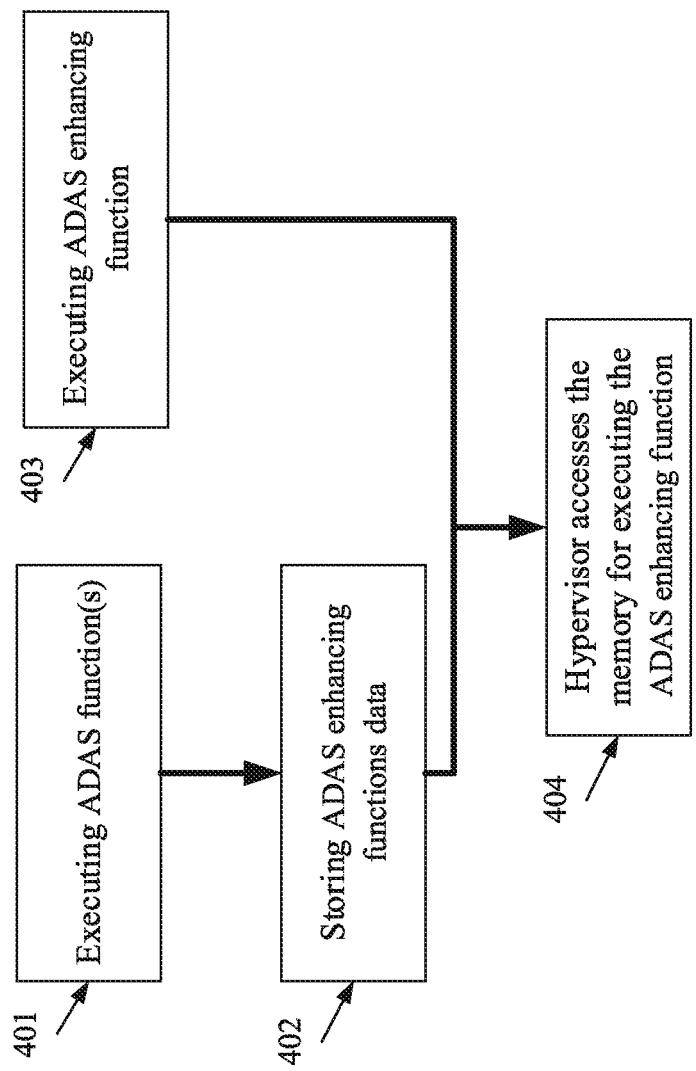
FIG. 5 is a flowchart 400 of an exemplary usage of data calculated by an ADAS function executed using the ADAS processing unit(s) as an input for an ADAS enhancing function or an IVI function executed by the application processing unit(s) 104, according to some embodiments of the present invention.

Reference is now also made to FIG. 5 which is a flowchart 400 of an exemplary usage of data calculated by an ADAS function(s) executed using the ADAS processing unit(s) 103 as an input for an ADAS enhancing function or an IVI function executed by the application processing unit(s) 104, according to some embodiments of the present invention. In use, as shown at 401, one or more ADAS function(s) are executed. As shown at 402 this generates data such as velocity value, movement value, collusion alert value, lane departure warning value and/or the like. This data is stored in the memory 108 of the ADAS processing unit(s) 103 and/or available by querying the ADAS server 102. As shown at 403, ADAS enhancing function is executed by the application processing unit(s) 104. As shown at 404, the memory 108 of the ADAS processing unit(s) 103 or the ADAS server is accessed via the hypervisor 107 to acquire the ADAS data and to use it as an input for processing an ADAS enhancing function or an IVI function. For example, this process allows the IVI VM for example to receive data captured by vehicle sensors and processed by the ADAS processing unit(s) 103. The IVI VM can now analyze the received data and/or transmit it to a remote server via a network interface. The data may be single images, continuous video and/or multiple frames received by the ADAS server 102, optionally with image or video metadata (e.g. time, location and/or the like) as received from one or more image sensors and/or other sensors which are directly connected to the ADAS server 102.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a memory, a channel, a network, a communication and/or the like is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A System on Chip (SoC), comprising:
an Integrated Circuit (IC) integrating the following into a single chip:
at least one Advanced Driver Assistance System (ADAS) processing unit;
at least one application processing unit;
at least one memory storing ADAS code comprising ADAS computer instructions adapted to be executed on said at least one ADAS processing unit for processing vehicle sensor data and Virtual Machine (VM) code for executing on said at least one application processing unit at least one VM, wherein said VM code is executed separately and independently from an execution of said ADAS code; and
a hypervisor which manages an execution of at least one Operation System (OS) of said at least one VM and an access to a processor shared memory of said at least one ADAS processing unit for acquiring an outcome of executing said ADAS computer instructions for the completion of an ADAS enhancing function by said execution of said at least one VM on said at least one application processing unit.

2. The system of claim 1, wherein said hypervisor manages an allocation of a hardware resource shared by said at least one VM and at least one thread generated by an execution of said ADAS code by said at least one ADAS processing unit.

3. The system of claim 2, wherein said allocation is done at a build or setup stage.

4. The system of claim 2, wherein said hardware resource is said at least one application processing unit.

5. The system of claim 2, wherein said hardware resource is selected from a group consisting of a display, a storage memory, Serial Advanced Technology Attachment (ATA) (SATA), and a Universal Serial Bus (USB) port.

6. The system of claim 2, wherein said at least one VM comprises an ADAS enhancing VM for executing a plurality of ADAS enhancing functions using said outcome.

7. The system of claim 6, wherein said at least one VM further comprises at least one In-Vehicle Infotainment (IVI) VM for executing a plurality of IVI functions using said application processing unit.

8. The system of claim 7, wherein said hypervisor prioritizes a usage of said at least one application processing unit by said ADAS enhancing VM over said at least one IVI VM based on one or more predefined priority rules.

9. The system of claim 6, wherein said plurality of ADAS enhancing functions comprises instructions to display said outcome on a map display executed by said ADAS enhancing VM.

10. The system of claim 6, wherein said plurality of ADAS enhancing functions comprises instructions to display said outcome on a dashboard display executed by said ADAS enhancing VM.

11. The system of claim 1, wherein said at least one ADAS processing unit comprises at least one digital signal processing unit and said at least one application processing unit comprises at least one Central Processing Unit (CPU) used for executing functions of both said at least one VM and said ADAS code.

12. The system of claim 1, wherein said ADAS code and said at least one VM are executed on different operating systems.

13. The system of claim 1, wherein when a reboot is held, said hypervisor is loaded as an outcome of executing a thread of said ADAS code.

14. The system of claim 1, wherein when a reboot is held said hypervisor loads said at least one VM only after said ADAS code is loaded and executed by said at least one ADAS processing unit.

15. The system of claim 1, wherein an execution of said ADAS code comprises execution of a plurality of ADAS functions each selected from a group consisting of: Adaptive Cruise Control (ACC), adaptive high beam, glare-free high beam and pixel light, adaptive light control: swiveling curve lights, automatic parking, automotive night vision, blind spot monitor, collision avoidance system, crosswind stabilization, driver drowsiness detection, driver Monitoring System, electric vehicle warning sounds, emergency driver assistant, Forward Collision Warning, Intersection assistant, Hill descent control, intelligent speed adaptation or Intelligent peed Advice (ISA), Lane departure warning system, Lane change assistance, Pedestrian protection system, Traffic sign recognition, Turning assistant, Vehicular communication systems, Wrong-way driving warning, and lane departure warning.

16. A method of executing an Advanced Driver Assistance System (ADAS) enhancing function on a System on Chip (SoC), comprising:
processing vehicle sensor data according to at least one ADAS function by executing ADAS code on at least one ADAS processing unit integrated in an Integrated Circuit (IC);
storing at least one outcome of said processing in a processor shared memory of said at least one ADAS processing unit;
using a hypervisor to manage execution of at least one operation system of at least one Virtual Machine (VM) on at least one application processing unit integrated in said IC separately and independently from an execution of said ADAS code;
managing by said hypervisor an access to said processor shared memory of said ADAS processing unit for acquiring said at least one outcome for a completion of said ADAS enhancing function by execution of said at least one VM on said at least one application processing unit.

17. A non-transitory computer readable medium comprising computer executable instructions adapted to perform the method of claim 16.

18. A computer program product for executing an Advanced Driver Assistance System (ADAS) enhancing function on System on Chip (SoC), the computer program product comprising a non-transitory computer readable storage medium having program instructions embodied therewith, the program instructions executable by processors to cause the SoC to:
process vehicle sensor data according to at least one ADAS function by executing ADAS code on at least one ADAS processing unit integrated in an Integrated Circuit (IC);
store at least one outcome of said processing in a processor shared memory of said at least one ADAS processing unit;

use a hypervisor to manage execution of at least one operation system of at least one Virtual Machine (VM) on at least one application processing unit integrated in said IC separately and independently from an execution of said ADAS code;

manage by said hypervisor an access to said processor shared memory of said ADAS processing unit for acquiring said at least one outcome for a completion of said ADAS enhancing function by execution of said at least one VM on said at least one application processing unit.

\* \* \* \* \*

UNITED STATES PATENT AND TRADEMARK OFFICE
CERTIFICATE OF CORRECTION

PATENT NO. : 10,169,066 B2
APPLICATION NO. : 15/228078
DATED : January 1, 2019
INVENTOR(S) : Dan Atsmon et al.

It is certified that error appears in the above-identified patent and that said Letters Patent is hereby corrected as shown below:

In the Claims

Column 14 in Claim 15, Lines 24-25, correct "Intelligent peed Advice (ISA)" to read "Intelligent Speed Advice (ISA)".

Signed and Sealed this
Twenty-sixth Day of February, 2019

Andrei Iancu
*Director of the United States Patent and Trademark Office*